(12) United States Patent
Xu et al.

(10) Patent No.: US 10,845,211 B2
(45) Date of Patent: Nov. 24, 2020

(54) TEMPERATURE AND PRESSURE SENSORS AND METHODS

(71) Applicants: Florida State University Research Foundation, Inc., Tallahassee, FL (US); Government of the United States as Represented by the Secretary of the Air Force, Wright-Patterson, OH (US)

(72) Inventors: Chengying Xu, Tallahassee, FL (US); Amanda Schrand, Eglin, FL (US); Reamonn Soto, Daytona Beach, FL (US)

(73) Assignee: Florida State University Research Foundation, Inc., Tallahassee, FL (US)

(*) Notice: Subject to any disclaimer, the term of this patent is extended or adjusted under 35 U.S.C. 154(b) by 302 days.

(21) Appl. No.: 15/863,150

(22) Filed: Jan. 5, 2018

(65) Prior Publication Data

US 2018/0195879 A1 Jul. 12, 2018

Related U.S. Application Data

(60) Provisional application No. 62/443,103, filed on Jan. 6, 2017.

(51) Int. Cl.
*G01K 7/00* (2006.01)
*G01D 3/08* (2006.01)
(Continued)

(52) U.S. Cl.
CPC .............. *G01D 3/08* (2013.01); *G01K 7/32* (2013.01); *G01K 7/343* (2013.01); *G01L 9/007* (2013.01);
(Continued)

(58) Field of Classification Search
USPC .................................. 374/163, 184
See application file for complete search history.

(56) References Cited

U.S. PATENT DOCUMENTS 6,278,379 B1 * 8/2001 Allen .................. B60C 23/0408
324/655
2002/0003463 A1 1/2002 Shin et al.
(Continued)

OTHER PUBLICATIONS

International Search Report and Written Opinion, PCT/US2018/012538, dated Sep. 10, 2018 (10 pp.).
(Continued)

*Primary Examiner* — Mirellys Jagan
(74) *Attorney, Agent, or Firm* — Eversheds Sutherland (US) LLP (57) ABSTRACT

Temperature sensors, pressure sensors, methods of making the same, and methods of detecting pressures and temperatures using the same are provided. In an embodiment, the temperature sensor includes a ceramic coil inductor having a first end plate and a second end plate, wherein the ceramic coil inductor is formed of a ceramic composite that comprises carbon nanotubes or, carbon nanofibers, or a combination of carbon nanotubes and carbon nanofibers thereof dispersed in a ceramic matrix; and a thin film polymer-derived ceramic (PDC) nanocomposite disposed between the first and the second end plates, wherein the thin film PDC nanocomposite has a dielectric constant that increases monotonically with temperature.

8 Claims, 7 Drawing Sheets

(51) Int. Cl.
*G01L 9/10* (2006.01)
*G01K 7/34* (2006.01)
*G01L 9/00* (2006.01)
*G01L 19/04* (2006.01)
*G01K 7/32* (2006.01)

(52) U.S. Cl.
CPC .............. *G01L 9/105* (2013.01); *G01L 19/04* (2013.01); *G01K 2211/00* (2013.01)

(56) References Cited

U.S. PATENT DOCUMENTS

| | | | |
|---|---|---|---|
| 2006/0084752 A1 | 4/2006 | Ounaies et al. | |
| 2008/0122439 A1* | 5/2008 | Burdick | G01R 33/341 324/307 |
| 2010/0321191 A1 | 12/2010 | Gong et al. | |
| 2015/0028889 A1 | 1/2015 | Gong et al. | |
| 2016/0009741 A1 | 1/2016 | Singh et al. | |
| 2016/0176156 A1 | 6/2016 | Xu | |
| 2017/0341297 A1 | 11/2017 | Xu et al. | |
| 2018/0111338 A1 | 4/2018 | Xu et al. | |
| 2019/0067806 A1 | 2/2019 | Xu et al. | |

OTHER PUBLICATIONS

Cheng et al., "Wireless passive high-temperature sensor based on multifunctional reflective patch antenna up to 1050 degrees centigrade," Sensors and Actuators A: Physical 222 (2015) 204-211.

Cheng, et al., "Evanescent-mode-resonator-based and antenna-integrated wireless passive pressure sensors for harsh-environment applications," Sensors and Actuators A: Physical 220 (2014) 22-33.

Yang et al., "High electrical conductivity and anisotropy of aligned carbon nanotube nanocomposites reinforced by silicon carbonitride," Scripta Materialia 124 (2016) 21-25.

Yang et al., "Strong and ultra-flexible polymer-derived silicon carbonitride nanocomposites by aligned carbon nanotubes," Ceramics International 42 (2016) 13359-13367.

Extended European Search Report issued in corresponding European Application No. 18777486.4 dated Jun. 25, 2020 (12 pages).

* cited by examiner

TEMPERATURE AND PRESSURE SENSORS AND METHODS

CROSS-REFERENCE TO RELATED APPLICATIONS

This application claims priority to U.S. Provisional Patent Application No. 62/443,103, filed on Jan. 6, 2017, which is incorporated herein by reference in its entirety.

STATEMENT REGARDING FEDERALLY SPONSORED RESEARCH OR DEVELOPMENT

This invention was made with government support under contract number N00014-11-1-0706 awarded by the Office of Naval Research. The government has certain rights in the invention. This invention was made with Government support from the U.S. Air Force under Grant No. FA8651-17-1-0005. The Government of the United States has the right to practice or have practiced on behalf of the United States this subject invention throughout the world.

BACKGROUND

Maintaining situational awareness of the weapon environment is desirable for developing the next generation of robust missile and munition (M&M) systems that can withstand the extreme acceleration, temperature, and pressure conditions that are presented by traditional fighter and hypersonic aircraft. Conventional techniques for remotely monitoring munition assets are primarily performed by proximate environmental monitoring by fuel sensors, accelerometers, surface acoustic wave sensors, chemical resistors, and temperature sensors, which unfortunately are limited to storage and transportation purposes. In addition, conventional temperature testing for M&M surveillance is performed over a limited temperature range, e.g., −55° C. to 125° C.

Typical conventional temperature sensors used in the evaluation of M&M systems include thermocouples, thermistors, resistance thermometers, quartz thermometers, which all include a metallic coil inductor. However, these temperature sensors have certain drawbacks. For example, these temperature sensors cannot be used in high temperature environments (e.g., 800° C. to 1400° C.) for prolonged periods of time due to oxidation of the metallic coil inductor, or can only be used under wired measurement conditions, and therefore are not suitable for in-flight monitoring. As a result, these temperature sensors can provide only limited evaluation of M&M systems.

It therefore would be desirable to provide improved temperature sensors that overcome one or more of the foregoing limitations. In particular, it would be desirable to provide a temperature sensor that can withstand high temperatures for prolonged periods of time, along with the ability to wirelessly transmit real-time, in-flight temperature data of M&M systems.

Similarly, real-time, online pressure monitoring is desired for many harsh-environment applications, such as gas turbines for power generation, to maintain operational effectiveness and safety. However, in such applications, suitable pressure sensors need to withstand corrosive gas environments having high temperatures (e.g., 1000° C. to 1400° C.) and high pressures (e.g., 300 psi to 600 psi).

Typical conventional pressure sensors used in these applications include passive pressure sensors based on resistive or capacitive sensing mechanisms. However, these pressure sensors have certain drawbacks. For example, wire interconnection is required to interrogate these sensors, and these sensors cannot operate effectively in high temperature environments. Moreover, pressure sensors that utilize a patch antenna operate within a limited temperature range, e.g., −55° C. to 125° C., because of the metallic wire used with the patch antenna. As a result, the application of these common pressure sensors is limited.

It therefore would be desirable to provide improved pressure sensors that overcome one or more of the foregoing limitations. In particular, it would be desirable to provide a pressure sensor that can withstand high temperatures and pressures for prolonged periods, along with the ability to wirelessly transmit real-time pressure data.

SUMMARY

In one aspect, a temperature sensor is provided which includes: a ceramic coil inductor having a first end plate and a second end plate, wherein the ceramic coil inductor is formed of a ceramic composite that comprises carbon nanotubes, carbon nanofibers, or a combination thereof dispersed in a ceramic matrix; and a thin film polymer-derived ceramic (PDC) nanocomposite disposed between the first and the second end plates, wherein the thin film PDC nanocomposite has a dielectric constant that increases monotonically with temperature.

In another aspect, a pressure sensor is provided including: a ceramic coil inductor having a first end plate and a second end plate, wherein the ceramic coil inductor is formed of a ceramic composite that comprises carbon nanotubes, or carbon nanofibers, or a combination of carbon nanotubes and carbon nanofibers thereof dispersed in a ceramic matrix; and a PDC nanocomposite structure disposed between the first and the second end plates, wherein the PDC nanocomposite structure has walls that define an internal cavity having a first cavity surface and an opposed second cavity surface, wherein the first and second cavity surfaces are spaced a distance from one another and the distance varies proportionally to the atmospheric pressure outside of the pressure sensor.

In another aspect, a method for making a wireless sensor is provided, the method including: disposing a PDC nanocomposite between a first end plate and a second end plate of a ceramic coil inductor, wherein the ceramic coil inductor comprises carbon nanotubes, or carbon nanofibers, or a combination of carbon nanotubes and carbon nanofibers thereof dispersed in a ceramic matrix, wherein the sensor is a temperature sensor or a pressure sensor.

In another aspect, a method of detecting a change in temperature is provided, the method including: placing one or more temperature sensors described above in an environment; and measuring a frequency shift of an electromagnetic signal induced in the ceramic coil to detect a change in temperature of the environment.

In another aspect, a method of detecting a change in pressure is provided, the method including: placing one or more pressure sensors described above in an environment; and measuring a frequency shift of an electromagnetic signal induced in the ceramic coil inductor to detect a change in pressure of the environment.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale.

DETAILED DESCRIPTION

New temperature and pressure sensors are provided herein that may include a ceramic coil inductor having ceramic material and a relatively high volume fraction of carbon nanotubes. The combination leverages the remarkable electrical and mechanical properties (stiff and strong) of carbon nanotubes (CNTs) and the thermal properties (temperature sensitivity) of ceramic materials.

In some embodiments, the temperature sensors provided herein are high temperature, wireless sensors having one or more of the following advantages: (i) the ability to provide real-time, in-flight monitoring of M&M systems; (ii) the ability to maintain safety and effectiveness of critical parts and materials of the M&M systems without the need for extensive non-destructive evaluation (NDE), thereby reducing cost and time; and (iii) on-demand tracking and assessing of the status of the M&M systems over extended periods, based upon changing conditions.

Similarly, in some embodiments, the pressure sensors provided herein are wireless and can operate in harsh, corrosive gaseous environments having high temperatures and pressures. These sensors have one or more of the following advantages: (i) the ability to provide real-time, monitoring of systems that operate in high temperature and pressure environments; (ii) the ability to maintain safety and effectiveness of critical parts and materials of these systems, thereby reducing cost and time; and (iii) on-demand tracking and assessing of the status of systems over extended periods, based upon changing conditions.

Temperature Sensors

In some embodiments, the temperature sensors include a ceramic coil inductor that is formed of a ceramic composite and a thin film polymer-derived ceramic (PDC) nanocomposite having a dielectric constant that increases monotonically with temperature.

Figure 1A:
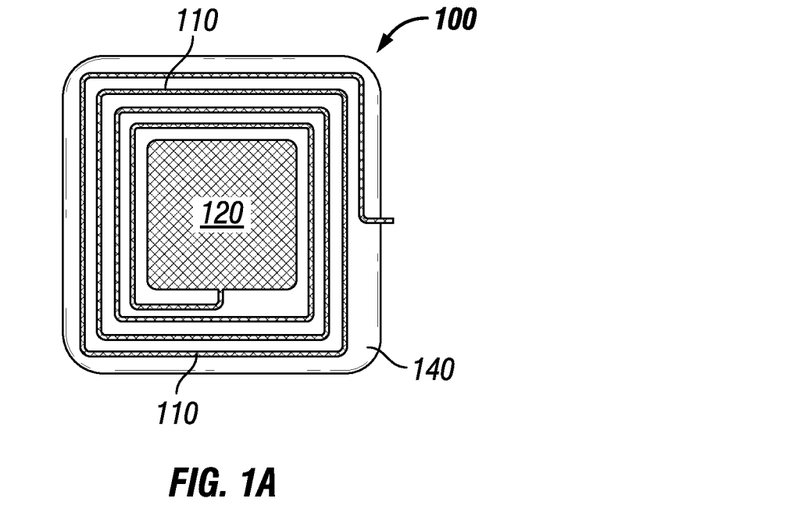
FIG. 1A is a top plan view of a temperature sensor in accordance with an embodiment of the present disclosure.
Figure 1B:
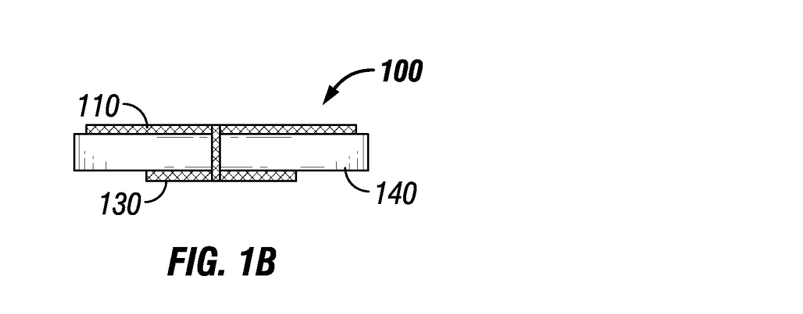
FIG. 1B is an elevated side view of the temperature sensor in FIG. 1A.
Figure 1C:
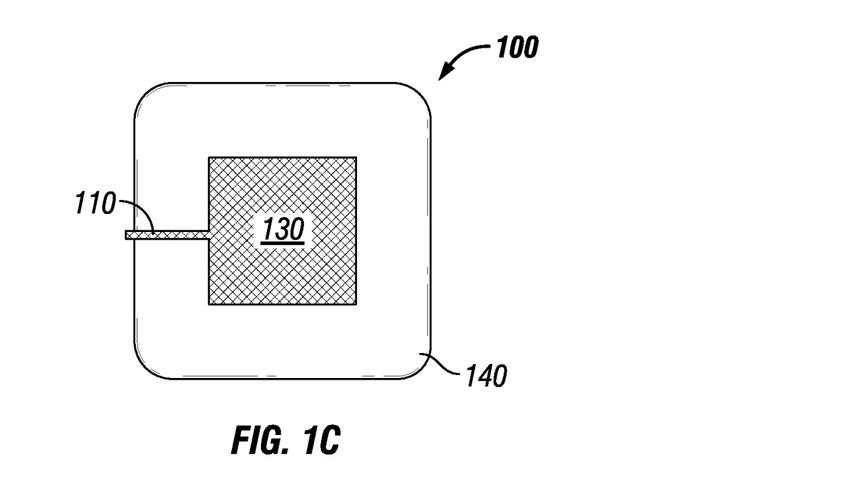
FIG. 1C is a bottom plan view of the temperature sensor in FIG. 1A.

An exemplary embodiment is illustrated in FIGS. 1A-1C. In this embodiment, the temperature sensor 100 includes a ceramic coil inductor 110 having a first end plate 120 and a second end plate 130. The temperature sensor 100 further includes a PDC nanocomposite 140 that is disposed between the first and second end plates, 120, 130.

In certain embodiments, the ceramic coil inductor 110 is configured to communicate with an external radio frequency antenna. In other embodiments, the temperature sensor 100 includes a patch antenna that is attached to the first end plate 120 of the ceramic coil inductor 110 and is configured to communicate with an external radio frequency antenna. Therefore, by using wireless transmission, the signal transmission distance can be accomplished over a network of RF links, such as satellite, the Internet, and/or infrared data links, or any other desired communication path.

Figure 8:
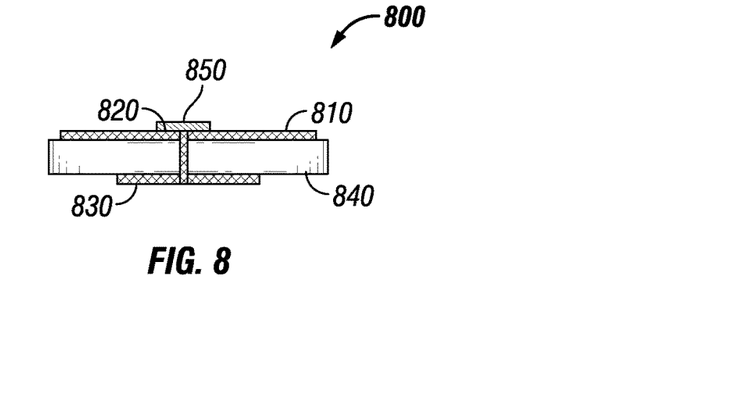
FIG. 8 is an elevated side view of a temperature sensor according to an embodiment of the present disclosure.

FIG. 8 illustrates an elevated side view of a temperature sensor 800 according to another embodiment of the present disclosure. In this embodiment, the temperature sensor 800 includes a ceramic coil inductor 810 having a first end plate 820 and a second end plate 830. The temperature sensor 800 further includes a PDC nanocomposite 840 that is disposed between the first and second end plates, 820, 830.

The temperature sensor 800 further includes a patch antenna 850 that is attached to the first end plate 820 of the ceramic coil inductor 810 and is configured to communicate with an external radio frequency antenna. Therefore, by using wireless transmission, the signal transmission distance can be accomplished over a network of RF links, such as satellite, the Internet, and/or infrared data links, or any other desired communication path.

Polymer-derived ceramic (PDC) materials are synthesized by thermal decomposition of polymeric precursors, instead of by conventionally sintering ceramic powder compacts. The polymeric precursor is in liquid form, and solidified into a polymer phase and then further pyrolyzed into a ceramic phase.

Figure 2:
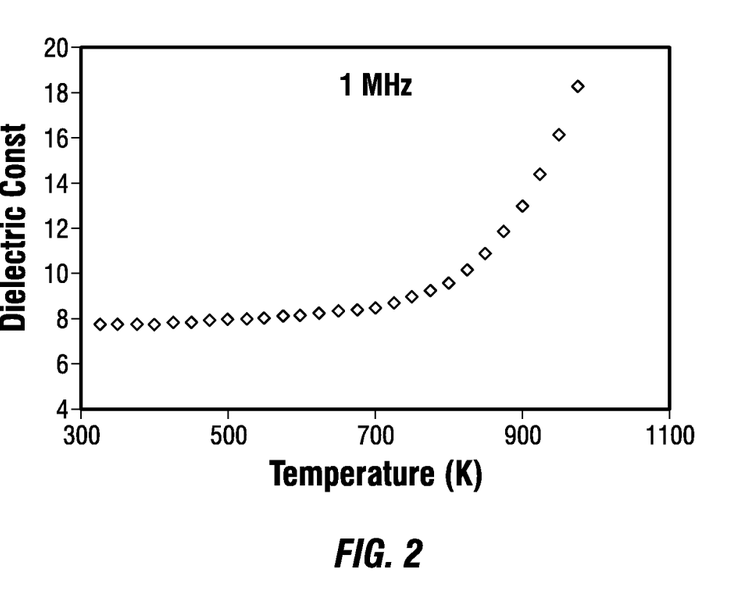
FIG. 2 is a graph showing the dielectric constant of polymer-derived ceramic material as a function of temperature at 1 MHz.

It has been demonstrated that the electrical conductivity of PDC materials can be greatly varied by tailoring the composition of the PDC materials from being an insulator to a semiconductor. When in the insulator state, PDC materials possess a dielectric constant that increases monotonically with temperature. This is desired because, when the dielectric constant can be determined, the environmental temperature the sensor is experiencing can be calculated. As shown in FIG. 2, this trend has been verified for temperatures up to 1000 K (727° C.) at 1 MHz.

Figure 3:
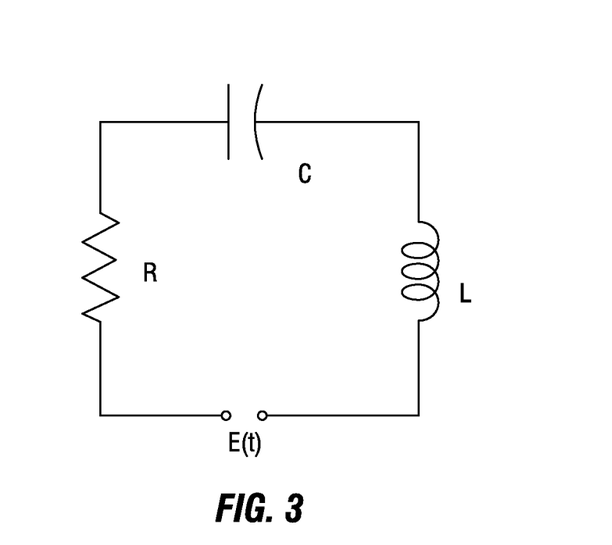
FIG. 3 is a schematic of an exemplary temperature sensor represented as a passive resistor-inductor-capacitor (RLC) circuit.

In embodiments, the present temperature sensors can be represented as a passive resistor-inductor-capacitor (RLC) circuit, which receives electromagnetic energy from an external transmitter/receiver as shown in FIG. 3.

The permittivity ε of the PDC nanocomposite is a function of temperature as indicated in Equation (1):

$$\varepsilon = \varepsilon(T) \tag{1}$$

This results in the capacitance C of the RLC circuit being temperature dependent as indicated in Equation 2:

$$C = \varepsilon \frac{A}{d} \quad (2)$$

where A is the area of the end plate that serves as the bottom plate of the ceramic coil inductor, e.g., the second end plate 130, and d is the distance between two plates (and is also the thickness of ceramic material).

Since the inductance L is a constant, the frequency f of the RLC circuit can then be expressed as Equation 3:

$$f = \frac{1}{2\pi\sqrt{CL}} \quad (3)$$

Therefore, the frequency electromagnetic wave generated by the sensor will change as a function of the temperature. This change in frequency can be transmitted by either the ceramic coil inductor itself or by a patch antenna attached thereto and received by a remotely placed RF reader antenna.

In embodiments, the ceramic composite comprises a ceramic matrix and carbon nanotubes or carbon nanofibers, or a combination of carbon nanotubes and nanofibers dispersed in the ceramic matrix. In some embodiments, the ceramic matrix comprises a polymer-derived ceramic (PDC) material.

In some embodiments, the carbon nanotubes comprise single-walled carbon nanotubes, multi-walled carbon nanotubes, or a combination thereof.

Figure 4A:
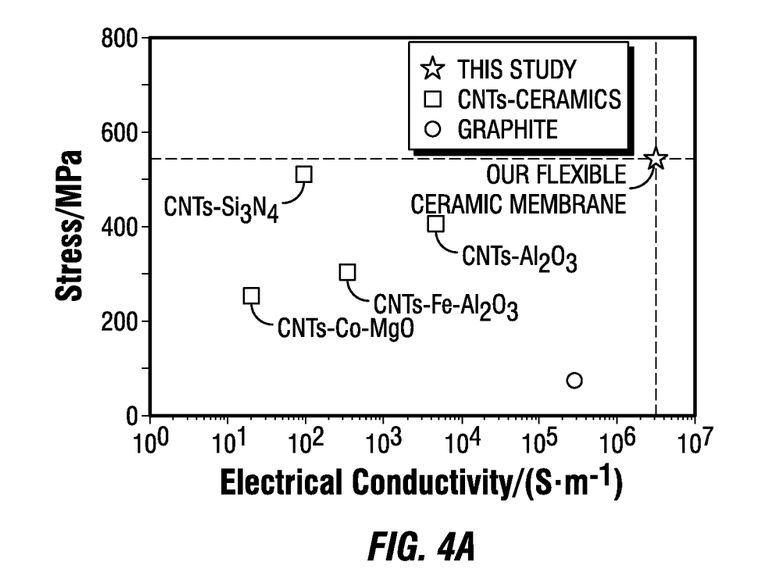
FIG. 4A is a graph illustrating the mechanical and electrical properties of a ceramic composite of an exemplary temperature sensor of the present disclosure compared to other representative CNT-reinforced ceramic composites and graphite.

The ceramic composites provided herein generally may include a relatively high volume fraction of carbon nanotubes. As shown in FIG. 4A, it has been found that high volume fraction of carbon nanotubes in combination with a PDC material result in ceramic composites having greater electrical conductivity compared to other CNT-reinforced ceramic composites and to graphite. Therefore, high electrical conductivity, which is desirable, may be provided, at least in part, by the high volume of carbon nanotubes.

In embodiments, the volume fraction of carbon nanotubes in the composite material is about 15% to about 90%, for example about 15%, about 20%, about 25%, about 30%, about 35%, about 40%, about 45%, about 50%, about 55%, about 60%, about 65%, about 70%, about 75%, about 80%, about 85%, about 90%, or any ranges therebetween. In some embodiments, the volume fraction of carbon nanotubes in the composite material is about 30% to about 80%. In some embodiments, the volume fraction of carbon nanotubes in the composite material is about 40% to about 70%. In some embodiments, the volume fraction of carbon nanotubes in the composite material is about 60%.

Figure 4B:
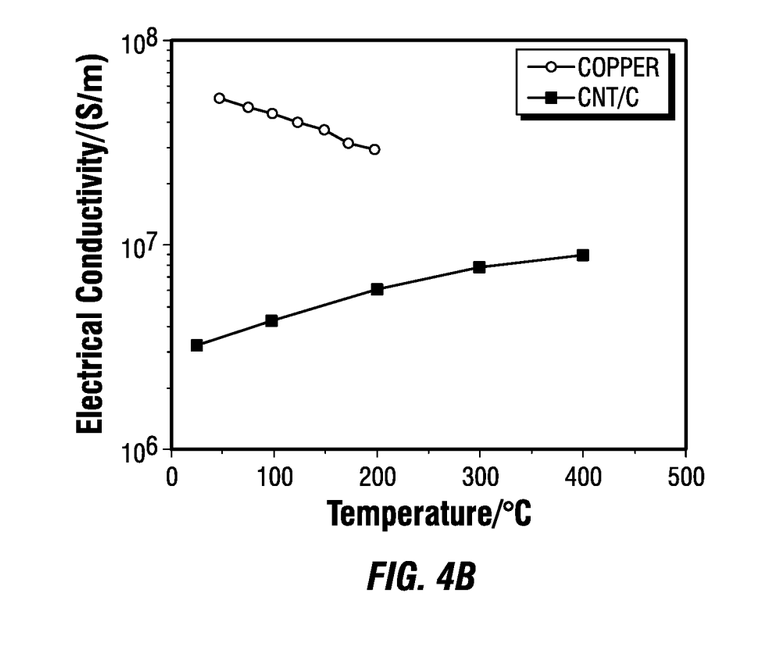
FIG. 4B is a graph showing a change in measured electrical conductivity of a ceramic composite of an exemplary temperature sensor of the present disclosure as a function of temperature.

Additionally, as illustrated in FIG. 4B, the present ceramic composites are lighter and possess a desirable amount of electrical conductivity, along with having the ability to withstand high temperatures. FIG. 4B compares the electrical conductivity changes with elevated temperature for an exemplary ceramic composite compared to copper. As seen in FIG. 4B, the electrical conductivity of the ceramic composite increases as the temperature increases to 750° C. This trend is desirable not only because the higher the electrical conductivity of the sensor, the greater the distance the sensor signal can be transmitted by the ceramic coil inductor itself or by the patch antenna, but also because elevated temperatures may not adversely affect the performance of the sensor.

Pressure Sensors

Generally, the pressure sensors comprise a ceramic coil inductor formed of a ceramic composite, which has carbon nanotubes or carbon nanofibers, or a combination of carbon nanotubes and carbon nanofibers dispersed in a ceramic matrix, and a polymer-derived ceramic (PDC) nanocomposite. In some embodiments, the ceramic matrix comprises a polymer-derived ceramic (PDC) material.

Figure 5A:
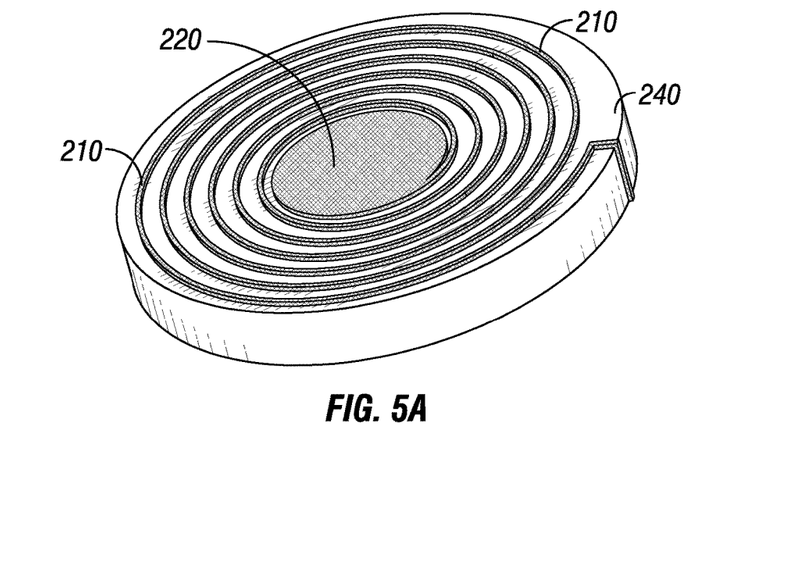
FIG. 5A is a top perspective view of a pressure sensor in accordance with an embodiment of the present disclosure.
Figure 5B:
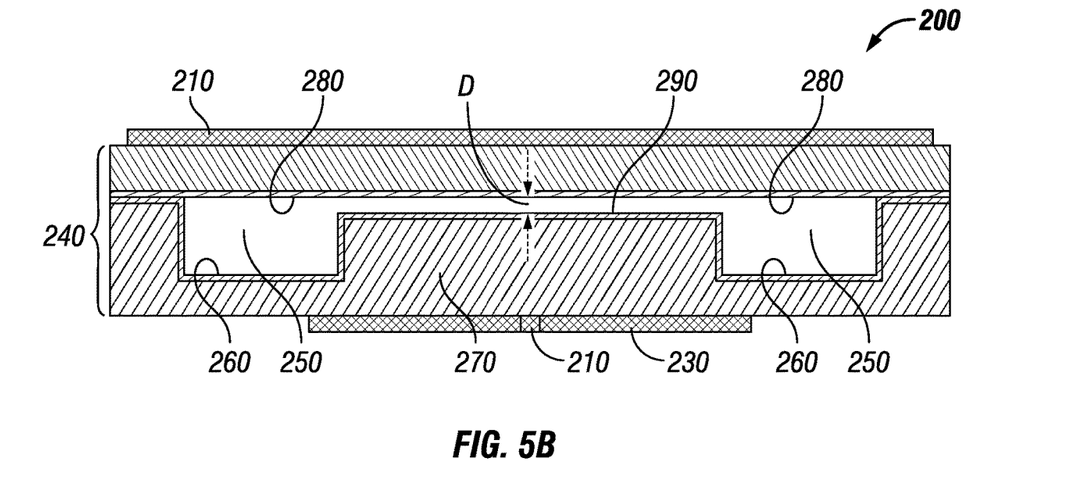
FIG. 5B is a cross-sectional view of the pressure sensor in FIG. 5A.
Figure 5C:
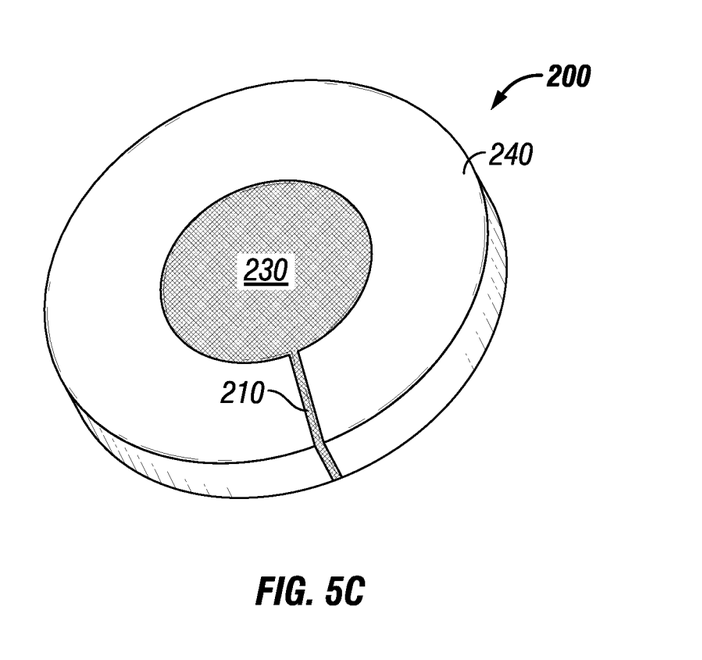
FIG. 5C is a bottom perspective view of the pressure sensor in FIG. 5A.

An exemplary embodiment of a pressure sensor is illustrated in FIGS. 5A-5C. In this embodiment, the pressure sensor 200 includes a ceramic coil inductor 210 having a first end plate 220 and a second end plate 230. The pressure sensor 200 further includes a PDC nanocomposite structure 240 that is disposed between the first and second end plates 220, 230. The PDC nanocomposite structure 240 has two opposed, generally disk shaped walls and an outer ring wall that together define an internal cavity 250. The internal cavity 250 is bounded, in part, by a first cavity surface 260, which includes a generally centrally-located elevated regional surface 290, and a second cavity surface 280. The elevated regional surface 290 is part of protrusion 270. The elevated regional surface 290 of the first cavity surface 260 is not in contact with the second cavity surface 280. Instead, the elevated regional surface 290 is spaced a distance D from the second cavity surface 280. The distance D will vary based on the differential between the pressure within the internal cavity 250 and the pressure of the external environment in which the pressure sensor 200 is located. The distance D will vary inversely proportional to the environmental pressure. In some embodiments, the protrusion 270 is generally in the shape of a cylindrical disk.

In certain embodiments, the ceramic coil inductor 210 is configured to communicate with an external radio frequency antenna. Therefore, by using wireless transmission, the signal transmission distance can be accomplished over a network of RF links, such as satellite, the Internet, and/or infrared data links, or any other desired communication path.

Figure 9:
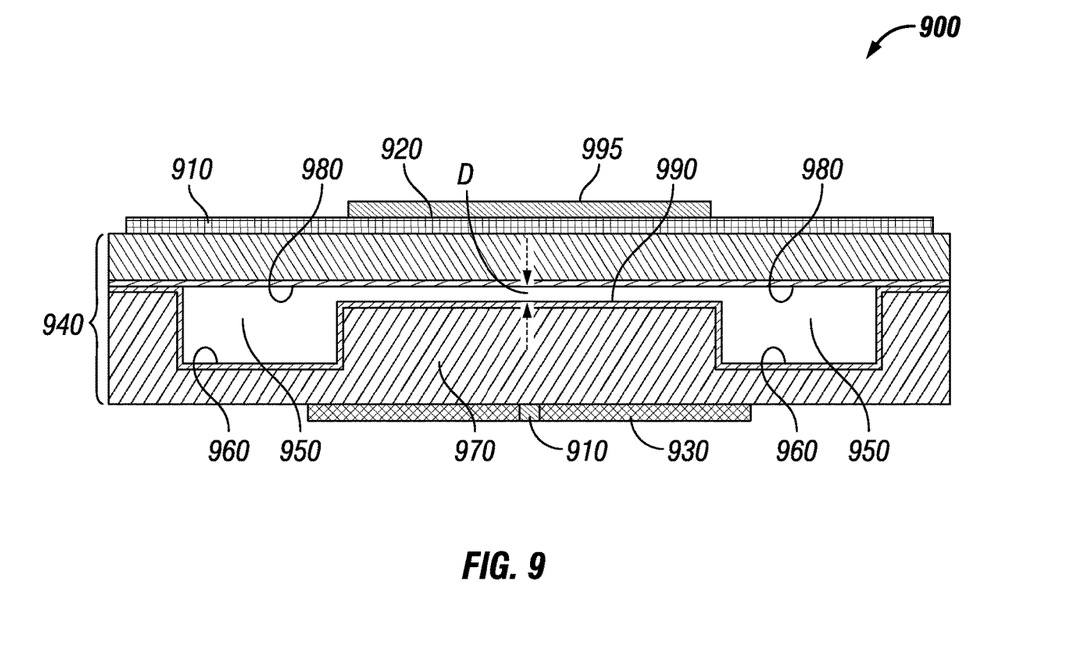
FIG. 9 is an elevated side view of a pressure sensor according to an embodiment of the present disclosure.

FIG. 9 illustrates an elevated side view of a pressure sensor 900 according to another embodiment of the present disclosure. In this embodiment, the pressure sensor 900 includes a ceramic coil inductor 910 having a first end plate 920 and a second end plate 930. The pressure sensor 900 further includes a PDC nanocomposite structure 940 that is disposed between the first and second end plates 920, 930. The PDC nanocomposite structure 940 has two opposed, generally disk shaped walls and an outer ring wall that together define an internal cavity 950. The internal cavity 950 is bounded, in part, by a first cavity surface 960, which includes a generally centrally-located elevated regional surface 290, and a second cavity surface 280. The elevated regional surface 990 is part of protrusion 970. The elevated regional surface 990 of the first cavity surface 960 is not in contact with the second cavity surface 980. Instead, the elevated regional surface 990 is spaced a distance D from the second cavity surface 980. The distance D will vary based on the differential between the pressure within the internal cavity 950 and the pressure of the external environment in which the pressure sensor 900 is located. The distance D will vary inversely proportional to the environmental pressure. In some embodiments, the protrusion 970 is generally in the shape of a cylindrical disk.

The pressure sensor 900 further includes a patch antenna 995 that is attached to the first end plate 920 of the ceramic coil inductor 910 and is configured to communicate with an external radio frequency antenna. Therefore, by wireless transmission, the signal transmission distance can be accomplished over a network of RF links, such as satellite, the Internet, and/or infrared data links, or any other desired communication path.

Figure 6:
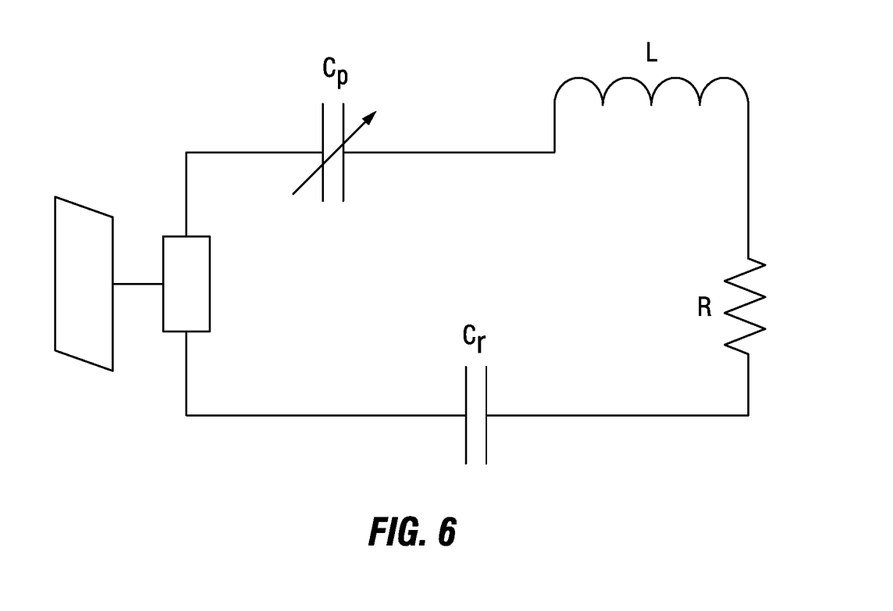
FIG. 6 is a schematic of an exemplary pressure sensor represented as an evanescent-mode cavity resonator.

In embodiments, the present pressure sensors can be represented as an evanescent-mode cavity resonator, which receives electromagnetic energy from an external transmitter/receiver as shown in FIG. 6.

The resonant frequency of the evanescent-mode resonator can be expressed as Equation (4):

$$f_r = \frac{1}{2\pi\sqrt{L(C_p + C_r)}} \quad (4)$$

where $C_p$ represents parallel-plate capacitance between the second cavity surface and the protrusion, $C_r$ is the remaining fringing capacitance, and L is the equivalent inductance.

The parallel-plate capacitance $C_p$ between the second cavity and the protrusion is expressed as indicated in Equation 5:

$$C_p = \frac{\varepsilon_o A}{\text{gap}} \quad (5)$$

where εo is the permittivity of the PDC nanocomposite at room temperature, A is the area of the first surface of the protrusion, and the gap is the distance between the second cavity surface and the first surface of the protrusion.

With pressure being applied to the pressure sensor, $C_p$ increases with the reduced gap due to the cavity deformation of the PDC nanocomposite, and therefore the gap is inversely proportional to pressure. Therefore, the frequency electromagnetic wave generated by the pressure sensor will change as a function of the applied pressure. This change in frequency can be transmitted by the ceramic coil inductor and received by a remotely placed RF reader antenna.

In some embodiments, the carbon nanotubes comprise single-walled carbon nanotubes, multi-walled carbon nanotubes, or a combination thereof.

As discussed above, the ceramic composites provided herein generally may include a relatively high volume fraction of carbon nanotubes. In embodiments, the volume fraction of carbon nanotubes in the composite material is about 20% to about 90%. In other embodiments, the volume fraction of carbon nanotubes in the composite material is about 30% to about 80%. In some particular embodiments, the volume fraction of carbon nanotubes in the composite material is about 40% to about 70%. In some embodiments, the volume fraction of carbon nanotubes in the composite material is about 60%.

Methods of Manufacture

Generally, the methods for making the wireless temperature and pressure sensors described herein include disposing a PDC nanocomposite between a first end plate and a second end plate of a ceramic coil inductor. The ceramic coil inductor comprises carbon nanotubes or carbon nanofibers, or a combination of carbon nanotubes and carbon nanofibers dispersed in a ceramic matrix.

Temperature Sensors

In some embodiments, the PDC nanocomposite is in the form of a thin film and has a dielectric constant that increases monotonically with temperature. In such embodiments, the method may further comprise attaching a patch antenna to the first end plate of the ceramic coil inductor.

In some embodiments, the method of making a wireless temperature sensor further includes forming the ceramic coil inductor and/or the PDC nanocomposite via an additive manufacturing process. Exemplary additive manufacturing processes are disclosed in U.S. Patent Application Publication No. 2017/0341297 A1, which is incorporated by reference herein.

In some embodiments, the additive manufacturing process includes (i) providing a mixture of a liquid-state pre-ceramic polymer and carbon nanotubes or carbon nanofibers, or a combination of carbon nanotubes and carbon nanofibers; (ii) disposing the mixture on a support; (iii) exposing the mixture to ultraviolet light effective to substantially cure the liquid-state pre-ceramic polymer; and (iv) subjecting the mixture to pyrolysis at a temperature and time effective to form the ceramic coil inductor or the PDC nanocomposite.

In some embodiments, the additive manufacturing process includes (i) providing a mixture of a liquid-state pre-ceramic polymer and carbon nanotubes or carbon nanofibers, or a combination of carbon nanotubes and carbon nanofibers; (ii) disposing a first portion of the mixture on a support; (iii) exposing the first portion of the mixture to ultraviolet light effective to substantially cure the liquid-state pre-ceramic polymer of the first portion; (iv) disposing a second portion of the mixture on the first portion; (v) exposing the second portion of the mixture to ultraviolet light effective to substantially cure the liquid-state pre-ceramic polymer of the second portion; and (vi) subjecting the first and second portions of the mixture to pyrolysis at a temperature and time effective to form the ceramic coil inductor or the PDC nanocomposite.

In some variations of the foregoing embodiments, the curing step may be effected by application of other suitable wavelengths of light and/or by heating the mixture.

In some embodiments, a 3D printing process is used to place the mixture of a liquid-state pre-ceramic polymer and carbon nanotubes or carbon nanofibers, or a combination of carbon nanotubes and carbon nanofibers, onto a support. 3D printing systems are known in the art and may be readily adapted to dispose the mixture on a support to form a ceramic coil inductor of the present temperature sensors.

In some embodiments, the support is maintained at a temperature equal to or less than the freezing point of the liquid-state pre-ceramic polymer. Not wishing to be bound by any particular theory, it is believed that a support maintained at such a temperature may allow the dimensions of the liquid-state pre-ceramic polymer disposed on the substrate to be at least substantially controlled.

In one embodiment, one or more additives are added to the mixture. The one or more additives may include powders, a UV sensitizer, or a combination thereof. The powders may include metal powders.

In embodiments, the liquid-state pre-ceramic polymer is a paste. In some particular embodiments, the liquid-state pre-ceramic polymer is an aqueous paste.

In one embodiment, the liquid-state pre-ceramic polymer is formed by mixing a pre-ceramic material and water. Proper mixing may be used to ensure that the mixture will be soluble enough to ease the deposition of the liquid-state pre-ceramic polymer, such as with 3D printing, with no entrapped gas in it.

In some embodiments, the liquid-state pre-ceramic polymer includes polysilazane.

The mixture may be formed by mixing the components in a suitable container (e.g., a beaker or other processing or reaction vessel), with mechanical stirring, such as with a magnetic mixer, for a period effective to substantially uniformly disperse the components with the mixture.

The viscosity of the liquid-state pre-ceramic polymer may be tested. Based on the viscosity, mixing may be continued as necessary, or the proportions of the components may be adjusted to achieve a desired viscosity, or a combination thereof.

When the liquid-state pre-ceramic polymer is a paste, the paste, in embodiments, should not be too thick or too watery, so that the paste can be suitably transported and deposited, and otherwise processed as described herein. Not wishing to be bound by any particular theory, it is believed that a relatively thick paste may make extrusion/printing/disposing more difficult to perform and/or may lead to cracks, while paste that is not viscous enough may make extrusion/printing/disposing hard to control and also may add time to the curing and/or pyrolysis steps. Viscosity checks, if necessary, may be performed frequently as mixing proceeds, and mixing stopped when a suitable viscosity is achieved.

Once the mixture is obtained, the mixture may be collected into a syringe or other device, for loading into a 3D printer or other apparatus configured to dispose the mixture on a substrate.

In some embodiments, the performance of the temperature sensors described herein may be tested using arc-jet facilities, such as a short-take and vertical landing (STOVL) jet facility, or wind tunnels.

Pressure Sensors

In some embodiments, the PDC nanocomposite defines an internal cavity having a first cavity surface from which a protrusion extends, but does not contact, a second cavity surface. The protrusion has a first surface that is spaced at a distance from the second cavity surface in which the distance is inversely proportional to pressure.

In some embodiments, the method for making the present wireless pressure sensors further includes forming the ceramic coil inductor and/or the PDC nanocomposite via an additive manufacturing process. Exemplary additive manufacturing processes are disclosed in U.S. Patent Application Publication No. 2017/0341297 A1, which is incorporated by reference herein.

In some embodiments, the additive manufacturing process for forming the ceramic coil inductor includes (i) providing a mixture of a liquid-state pre-ceramic polymer and carbon nanotubes or carbon nanofibers, or a combination of carbon nanotubes and carbon nanofibers; (ii) disposing the mixture on a support; (iii) exposing the mixture to ultraviolet light effective to substantially cure the liquid-state pre-ceramic polymer; and (iv) subjecting the mixture to pyrolysis at a temperature and time effective to form the ceramic coil inductor.

In some embodiments, the additive manufacturing process for forming the ceramic coil inductor includes (i) providing a mixture of a liquid-state pre-ceramic polymer and carbon nanotubes or carbon nanofibers, or a combination of carbon nanotubes and carbon nanofibers; (ii) disposing a first portion of the mixture on a support; (iii) exposing the first portion of the mixture to ultraviolet light effective to substantially cure the liquid-state pre-ceramic polymer of the first portion; (iv) disposing a second portion of the mixture on the first portion; (v) exposing the second portion of the mixture to ultraviolet light effective to substantially cure the liquid-state pre-ceramic polymer of the second portion; and (vi) subjecting the first and second portions of the mixture to pyrolysis at a temperature and time effective to form the ceramic coil inductor.

In some embodiments, the additive manufacturing process for forming the PDC nanocomposite includes (i) providing a mixture of a liquid-state pre-ceramic polymer and carbon nanotubes or carbon nanofibers, or a combination of carbon nanotubes and carbon nanofibers; (ii) disposing a first portion of the mixture on a first support; (iii) exposing the first portion of the mixture to ultraviolet light effective to substantially cure the liquid-state pre-ceramic polymer of the first portion; (iv) subjecting the first portion of the mixture to pyrolysis at a temperature and time effective to form a first section of the PDC nanocomposite, wherein the first portion comprises a first cavity surface; (v) metallizing the first portion of the PDC nanocomposite; (vi) disposing a second portion of the mixture on a second support; (vii) exposing the second portion of the mixture to ultraviolet light effective to substantially cure the liquid-state pre-ceramic polymer of the second portion; (viii) subjecting the second portion of the mixture to pyrolysis at a temperature and time effective to form a second section of the polymer derived-ceramic nanocomposite, wherein the second portion comprises a second cavity surface; metallizing the second portion of the PDC nanocomposite; and (ix) joining the first portion with the second portion to form the PDC nanocomposite.

In some variations of the foregoing embodiments, the curing step may be effected by application of other suitable wavelengths of light and/or by heating the mixture.

In one embodiment, disposing the mixture of a liquid-state pre-ceramic polymer and carbon nanotubes or carbon nanofibers, or a combination of carbon nanotubes and carbon nanofibers on a support includes 3D printing the mixture on a support.

In one embodiment, the support is maintained at a temperature equal to or less than the freezing point of the liquid-state pre-ceramic polymer. Not wishing to be bound by any particular theory, it is believed that a support maintained at such a temperature may allow the dimensions of the liquid-state pre-ceramic polymer disposed on the substrate to be at least substantially controlled.

In one embodiment, one or more additives are added to the mixture. The one or more additives may include powders, a UV sensitizer, or a combination thereof. The powders may include metal powders.

In embodiments, the liquid-state pre-ceramic polymer is a paste. In particular embodiments, the liquid-state pre-ceramic polymer is an aqueous paste.

In one embodiment, the liquid-state pre-ceramic polymer is formed by mixing a pre-ceramic material and water. Proper mixing may be used to ensure that the mixture will be soluble enough to ease the deposition of the liquid-state pre-ceramic polymer, such as with 3D printing, with no entrapped gas in it.

In one embodiment, the liquid-state pre-ceramic polymer comprises polysilazane.

The mixture may be formed by mixing the components in a suitable container (e.g., a beaker or other processing or reaction vessel), with mechanical stirring, such as with a magnetic mixer, for a period effective to substantially evenly mix the components.

The viscosity of the liquid-state pre-ceramic polymer may be tested. Based on the viscosity, mixing may be continued as necessary, or the proportions of the components may be adjusted to achieve a desired viscosity, or a combination thereof.

When the liquid-state pre-ceramic polymer is a paste, the paste, in embodiments, must not be too thick, nor too watery. Not wishing to be bound by any particular theory, it is believed that a relatively thick paste may make extrusion/printing/disposing more difficult to perform and/or may lead to cracks, while paste that is not viscous enough may make extrusion/printing/disposing hard to control and also may add time to the curing and/or pyrolysis steps. Viscosity checks, if necessary, may be performed frequently as mixing proceeds, and mixing may be stopped when good viscosity is achieved.

Once the mixture is obtained, the mixture may be collected into a syringe or other device, for loading into a 3D printer or other apparatus configured to dispose the mixture on a substrate.

Method of Use

Generally, the wireless temperature sensors described herein are used to detect a change in temperature of an environment, such as an in-flight environment of an M&M system. Similarly, the wireless pressure sensors described herein are used to detect a change in pressure of an environment, such as an operational environment of a gas turbine.

Temperature Sensors

In some embodiments, the method of detecting a change in temperature comprises placing one or more temperature sensors as described herein in an environment; and measuring a frequency shift of an electromagnetic signal induced in the ceramic coil inductor to detect a change in temperature of the environment.

As described herein, the change in permittivity of the ceramic matrix of the ceramic coil inductor is a function of temperature within the environment. In embodiments, the change in permittivity of the ceramic matrix results in the frequency shift of the electromagnetic signal.

In some embodiments, the one or more temperature sensors are configured to detect the change in temperature in the environment with a temperature in the range from about 800° C. to about 1000° C., for example, about 810° C., about 825° C., about 850° C., about 900° C., about 925° C., about 950° C., about 980° C., and any ranges therebetween. In some embodiments, the one or more temperature sensors are configured to detect the change in temperature in the environment with a temperature in the range of from about 25° C. to about 1000° C., for example about 25° C., about 100° C., about 200° C., about 300° C., about 400° C., about 500° C., about 600° C., about 700° C., about 800° C., about 900° C., about 100° C., and any ranges therebetween.

Figure 7:
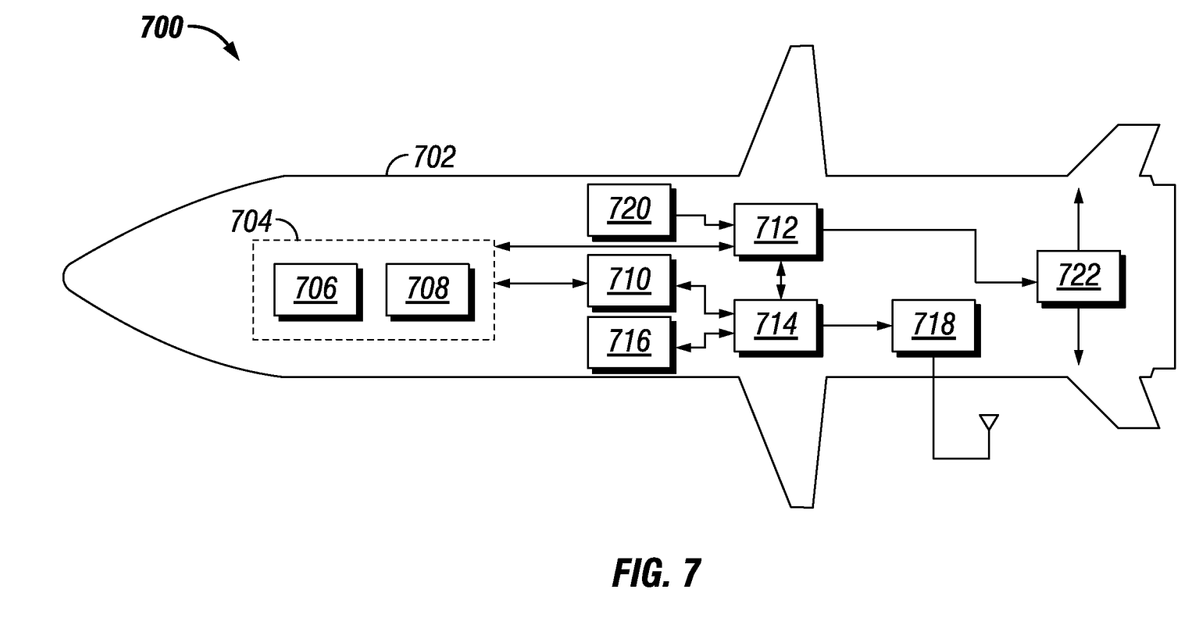
FIG. 7 is a schematic of a temperature sensor of the present disclosure integrated within an exemplary missile and munition (M&M) system.

FIG. 7 shows an exemplary system of a present temperature sensor integrated into an M&M system. The system 700 includes an aircraft 702, and a wireless ceramic temperature sensor 704 for in-flight heath monitoring. The wireless ceramic temperature sensor includes a wireless sensor 706 and an RF antenna 708. Using the RF antenna 708, the sensor 704 communicates with several field programmable gate arrays ("FPGA"). For example, the sensor 704 communicates with a DSP processing FPGA 710 and a control FPGA 712, each of which communicates with a processor interface FPGA 714. The processor interface 714 in turn communicates with a processor 716 and a secure communication FPGA 718. The control FPGA 712 communicates with a roll/pitch/altitude sensor 720 and a control motor 722, which may control parts of the aircraft 702.

Pressure Sensors

In some embodiments, the method of detecting a change in pressure comprises placing one or more pressure sensors as described herein in an environment; and measuring a frequency shift of an electromagnetic signal induced in the ceramic coil inductor to detect a change in pressure of the environment.

As described herein, the change in distance is a function of pressure within the environment. In embodiments, the change in the distance between the first surface of the protrusion and the second cavity surface results in the frequency shift.

In some embodiments, the one or more pressure sensors are configured to detect the change in pressure in the environment with a pressure in the range from about 0 psi to about 40,000 psi, for example about 1 psi, about 10 psi, about 50 psi, about 100 psi, about 150 psi, about 200 psi, about 300 psi, about 400 psi, about 500 psi, about 600 psi, about 700 psi, about 800 psi, about 900 psi, about 1,000 psi, about 2,000 psi, about 3,000 psi, about 4,000 psi, about 5,000 psi, about 6,000 psi, about 7,000 psi, about 8,000 psi, about 9,000 psi, about 10,000 psi, about 15,000 psi, about 20,000 psi, about 25,000 psi, about 30,000 psi, about 35,000 psi, about 40,000 psi, and any ranges therebetween.

It should be apparent that the foregoing relates only to certain embodiments of the present disclosure and that numerous changes and modifications may be made herein without departing from the spirit and the scope of the disclosure as defined by the following claims and equivalents thereof.

We claim:

1. A temperature sensor comprising:
    a ceramic coil inductor having a first end plate and a second end plate, wherein the ceramic coil inductor is formed of a ceramic composite that comprises carbon nanotubes, carbon nanofibers, or a combination thereof dispersed in a ceramic matrix; and
    a thin film polymer-derived ceramic (PDC) nanocomposite disposed between the first and the second end plates, wherein the thin film PDC nanocomposite has a dielectric constant that increases monotonically with temperature.

2. The temperature sensor of claim 1, wherein the ceramic coil inductor is configured to communicate with an external radio frequency antenna.

3. The temperature sensor of claim 1, further comprising a patch antenna configured to communicate with an external radio frequency antenna, wherein the patch antenna is attached to the first end plate of the ceramic coil inductor.

4. The temperature sensor of claim 1, wherein the volume fraction of carbon nanotubes in the ceramic composite is about 15% to about 70%.

5. The temperature sensor of claim 1, wherein the ceramic matrix comprises a PDC material.

6. The temperature sensor of claim 1, wherein the ceramic composite comprises single-walled carbon nanotubes, multi-walled carbon nanotubes, or a combination thereof.

7. A method of detecting a change in temperature, the method comprising:
    placing one or more temperature sensors of claim 1 in an environment; and
    measuring a frequency shift of an electromagnetic signal induced in the ceramic coil to detect a change in temperature of the environment.

8. The method of claim 7, wherein the one or more temperature sensors are configured to detect the change in temperature in the environment with a temperature in the range from about 25° C. to about 1000° C.

* * * * *

UNITED STATES PATENT AND TRADEMARK OFFICE
CERTIFICATE OF CORRECTION

PATENT NO. : 10,845,211 B2  
APPLICATION NO. : 15/863150  
DATED : November 24, 2020  
INVENTOR(S) : Chengying Xu, Amanda Schrand and Reamonn Soto Page 1 of 1

It is certified that error appears in the above-identified patent and that said Letters Patent is hereby corrected as shown below:

On the Title Page

At item (73), Assignee:
Add -- Government of the United States as Represented by the Secretary of the Air Force, Wright-Patterson AFB, OH (US) --

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*